United States Patent
Liu et al.

(10) Patent No.: US 8,085,852 B2
(45) Date of Patent: *Dec. 27, 2011

(54) INVERSE TONE MAPPING FOR BIT-DEPTH SCALABLE IMAGE CODING

(75) Inventors: Shan Liu, Cambridge, MA (US);
Anthony Vetro, Arlington, MA (US);
Woo-Shik Kim, Los Angeles, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1218 days.

This patent is subject to a terminal disclaimer.

(21) Appl. No.: 11/768,434

(22) Filed: Jun. 26, 2007

(65) Prior Publication Data
US 2009/0003457 A1    Jan. 1, 2009

(51) Int. Cl.
*H04N 11/02* (2006.01)
*H04B 1/66* (2006.01)
*H04B 14/00* (2006.01)

(52) U.S. Cl. ........... 375/240.25; 375/240.2; 382/162; 382/169; 382/232; 382/233; 382/248; 382/250; 382/254; 382/274; 358/1.9; 358/2.1; 358/504; 358/518

(58) Field of Classification Search ............. 375/240.2, 375/240.25; 382/162, 169, 232, 233, 248, 382/250, 254, 274; 358/1.9, 2.1, 504, 518
See application file for complete search history.

(56) References Cited

U.S. PATENT DOCUMENTS

| 7,627,187 | B2* | 12/2009 | Bossen | 382/250 |
| 2007/0201560 | A1* | 8/2007 | Segall et al. | 375/240.24 |
| 2008/0175497 | A1* | 7/2008 | Segall | 382/238 |
| 2008/0193032 | A1* | 8/2008 | Segall | 382/251 |
| 2009/0285283 | A1* | 11/2009 | Gao et al. | 375/240.08 |
| 2010/0020866 | A1* | 1/2010 | Marpe et al. | 375/240.02 |

OTHER PUBLICATIONS

Mantiuk, Rafal et al. "Backward Compatible High Dynamic Range MPEG Video Compression", 2006.*

Segall, Andrew and Yeping Su. "System for Bit-Depth Scalable Coding", Apr. 2007.*

Segall A et al.,"System for Bit-Depth Scalable Coding;" ITU Study Group 16,—Video Coding Experts Group—ISO/IEC MPEG & ITU-T VCEG(ISO/IEC JTC1/sc29/WG11 and ITU-T SG16 Q6), XX, XX, No. JVT-W113, Apr. 25, 2007 XP030007073.

Liu S et al. "Bit-Depth Scalable Coding for High Dynamic Range Video;" vol. 6822, No. 2, Jan. 29, 2008, pp. 682200-1, XP002517655.

(Continued)

*Primary Examiner* — Michael Simitoski
(74) *Attorney, Agent, or Firm* — Dirk Brinkman; Gene Vinokur

(57) ABSTRACT

A method performs inverse tone mapping of an image in a decoder. For each block of each color channel of the image the following steps are performed. A scaling factor is determined for a current block of the image by adding a predicted scaling factor for the current block to a difference between the predicted scaling factor and the scaling factor of an adjacent block. An offset value for the current block is determined by adding a predicted offset for the current block to a difference between the predicted offset value and the offset value of the adjacent block. The scaling factor and the offset value are applied to pixel intensity values of the current block to produce a mapped block in which a bit-depth of the mapped block is greater than the bit-depth of the current block.

15 Claims, 7 Drawing Sheets

OTHER PUBLICATIONS

Liu S et al: "Inter-Layer Pred for SVC Bit-Depth Scalability" ITU Study Group 16—Video Coding Experts Group—ISO/IEC MPEG & ITU-T VCEG(ISO/IEC JTC1/SC29WG11 and ITU-T VCEG(ISO/IEC JTC1/SC29/WG11 and ITU-T SG16 Q6), XX, XX, No. JVT-X075, Jun. 30, 2007 XP030007182.

Segall A et al.: CE1: Inter-Layer Prediction for SVC Bit-Depth Scalability; 25. JVT Meeting; 82 MPEG Meeting; Oct. 21, 2007-Oct. 2, 2007; Shenzhen, CN; (Join Video Team of ISO/IEC JTC1/SC29/WG11 and ITU-T SG.16), No. JVT-Y071, Oct. 24, 2007, XP030007275.

* cited by examiner

700

INVERSE TONE MAPPING FOR BIT-DEPTH SCALABLE IMAGE CODING

FIELD OF THE INVENTION

The invention relates generally to encoding and decoding images, and more particularly to encoding and decoding of a sequence of images with scalable bit-depths.

BACKGROUND OF THE INVENTION

In computer graphics, tone mapping changes the dynamic range of images. For example, tone mapping can change a high dynamic range (HDR) image to an image with a low dynamic range (LDR), or vice versa. In images, the dynamic range is determined by the number of bits (bit-depth) allocated to store pixel intensity values. Tone mapping attempts to avoid strong contrast reduction from scene radiance values to a renderable range while preserving image appearance.

Conventional video coding schemes, such as the MPEG, and ITU series of video coding standards, are well suited for the compression of videos with a fixed bit-depth, e.g., 8 bits per pixel (bpp). Consumer videos available on VHS and DVD, and digital television broadcasts are typically 8 bpp, and are referred to as having a low dynamic range (LDR). Videos with higher bit-depth, e.g., 10 to 24 bpp, are typically used for professional applications, and have a high dynamic range (HDR).

FIG. 1 shows a conventional encoder 100 with motion estimation 110. Input to the encoder is a fixed bit-depth sequence of images or video 101. Frames (images) in the video are partitioned into blocks, e.g., 8×8 or 16×16 pixels. Blocks are processed one at a time. A motion estimator 110 determines a best matching block of a reference frame stored in a frame memory 111 for a current block to be encoded. This best matching block serves as a prediction frame for the current block. A corresponding motion vector 112 is entropy encoded 150. A difference signal 122 between the current block of the input video and a predicted block 121 is determined 120, which is generated by a motion-compensated predictor 130. The difference signal then undergoes a transform/quantization process 140 to yield a set of quantized transform coefficients (texture) 141. These coefficients are entropy encoded 150 to yield a compressed output bitstream 109. Performing an inverse transform/quantization 160 on the quantized transform coefficients 121 and adding 170 the result to the motion compensated prediction 121 generates the reconstructed reference frame 161, which is stored in the frame memory 111 and used for predicting 130 of successive frames of the input video 101. The output encoded bitstream 109 is generated based on the entropy encoding 150 of motion vectors 112 and texture (DC coefficients) 141.

FIG. 2 shows a conventional decoder 200. An input encoded bitstream 201 is subject to an entropy decoder 210 that yields both quantized transform coefficients 211 as well as corresponding motion vectors 212. The motion vectors are used by a motion compensated predictor 220 to yield a prediction signal 221. The quantized transform coefficients 211 are inverse transform/quantized 230 and added 240 to the prediction signal 221 to yield a reconstructed fixed (single) bit-depth video 209. Frames of the reconstructed video, which are used for decoding successive frames, are stored to a frame memory 250. The combination of the encoder and decoder is known as a codec.

The above scheme achieves excellent compression efficiency when the input images have a fixed bit-depth. Currently, most consumer display can only render LDR 8 bpp videos. Therefore, conventional coding schemes can be applied directly.

To view videos with higher bit-depths, HDR display devices are required. Advances in display technology are making it possible for consumers to enjoy the benefits of HDR videos in the near future. To efficiently support both LDR and HDR display devices, a scalable representation of the video, which enables reconstruction for both or either of the LDR video and the HDR video, is required.

One method achieves a scalable representation by compressing the input HDR video and an LDR version in two separate passes, i.e., using a fixed bit-depth HDR encoder and a fixed bit-depth LDR encoder, respectively. This is referred to as simulcast coding. However, the compression efficiency of that method is very low due to the redundancy of the HDR and LDR versions. Also, the computational complexity is very high. A bit-depth scalable video compression scheme is described by Wink en et al. in "SVC bit-depth scalability," Joint Video Team, of ISO/IEC MPEG & ITU-T VCEG, Doc. JVT-V078, $22^{nd}$ Meeting, January 2007.

FIG. 3 shows a bit-depth scaleable encoder 300. An input: HDR video 301 is down-converted to an LDR video 101 using tone mapping 310. Then, the LDR video 101 is compressed to produce a base layer 109. Each current reconstructed frame 115 from the base layer is up-converted to the bit-depth of the input video 301 using inverse tone mapping 320 to produce an inverse tone mapped frame 321. The difference between the inverse tone mapped frame 321 and the input HDR frame 301 is determined 329, and the difference signal then undergoes a transform/quantization process 330 to yield a set of quantized transform coefficients 331. These coefficients are entropy encoded 340 to yield an enhancement layer 341. The enhancement layer bitstream 341 is multiplexed 350 with the base layer bitstream 109 to generate the output bit-depth scalable bitstream 309.

FIG. 4 shows the corresponding decoder 400. An input encoded bitstream 401 is demultiplexed 410 into a base layer 201 and an enhancement layer 402. The base layer is decoded as described above. The enhancement layer is also entropy decoded 210 and inverse transform/quantized to produce output 431. In this case, the output of the frame memory 250 is inverse tone mapped 420, and the output of the tone mapping is added to the output 431 to produce a reconstruction 409 of the input video 101.

In a prior art bit-depth scalable video codec, three methods for inverse tone mapping 320 are known, including: linear scaling, linear interpolation, and look-up table mapping. All of those methods apply the same inverse tone mapping to all of the frames in the entire video, which would not perform well when the LDR video is generated by localized or region-based tone mapping 310 methods from the HDR video.

In fact, localized tone mapping methods are used in many applications with regions of interest (ROI). Furthermore, the linear scaling and linear interpolation methods are relatively coarse, which result in poor inverse tone mapping quality, even for globally tone mapped LDR video. The look-up table mapping achieves better inverse tone mapping results, but requires an initial training to build a mapping of pixel intensity values by examining an entire video sequence. This process is very complex and results in considerable initial delay before decoding and display, and would not be suitable for many real-time applications. Also, that method does not perform well for many ROI applications.

Another inverse tone mapping method is described by Segall and Su, in "System for bit-depth scalable coding," Joint Video Team of ISO/IEC MPEG & ITU-T VCEG, Doc. JVT- W113, April 2007. In that method, two scale factors are used, one for luminance and the other for chrominance components. The scaling factors are assigned to each block to perform, the inverse tone mapping. Thus, that method is more suitable for ROI applications. As a major disadvantage, the scale factors are predefined as a set {0.5, 1, 1.5, 2, 2.5, 3, 3.5, 4, 4.5}, where the set of scale factor is suitable for input video at a particular bit-depth. Hence, the method loses the flexibility of compressing HDR videos with various bit-depths. Another disadvantage is that the identical scaling factor is used for all chrominance components. This can degrade the inverse tone mapping quality.

Clearly, it is desirable to have an inverse tone mapping that fits into a bit-depth scalable video compression scheme and overcomes the disadvantages of the prior art. Specifically, an inverse tone mapping technique is needed that yields high quality, is compatible with a wide range of tone mapping techniques, and does not incur substantial coding overhead.

SUMMARY OF THE INVENTION

A method and system perform inverse tone mapping of an image in a decoder. For each, block of each, color channel of the image the following steps are performed.

A scaling factor is determined for a current block of the image by adding a predicted scaling factor for the current block to a difference between the predicted scaling factor and the scaling factor of an adjacent block.

An offset value for the current block is determined by adding a predicted offset for the current block to a difference between the predicted offset value and the offset value of the adjacent block.

The scaling factor and the offset value are applied to pixel intensity values of the current block to produce a mapped block in which a bit-depth of the mapped block is greater than the bit-depth of the current block.

BRIEF DESCRIPTION OF THE DRAWINGS

Our invention provides a system and a method for converting between bit-depth representations of images and videos using tone mapping. The bit-depth conversion can be either from low to high (LDR→HDR) or from high to low (HDR→LDR). The image and video can be both one-channel monochrome, and multi-channel color. The block dimensions can be variable. The method uses the following parameters, a scaling factor, an offset value, and a prediction direction. The parameters are determined for each block in each color channel. We also describe a process for determining the optimal scaling factor. In contrast to conventional methods, which fix or limit the set of scaling factors, our scaling factors can be customized and the range of the scaling factors can be increased adaptively and dynamically in order accommodate a larger dynamic range in the images. The corresponding offset value and prediction direction are determined from the scaling factor.

To code the scaling factors and offset values efficiently in an encoded bitstream, taking into account the correlation that exists among adjacent blocks, each block is associated with one prediction direction for each color channel. The scaling factor and offset value for the current block are predicted from the scaling factors and offset values of (predicted) adjacent blocks.

The embodiments of the invention are described for an up-conversion, i.e., from a LDR video to a HDR video. The invention can also be used for a down-conversion from a HDR video to a LDR video, in which case the LDR and HDR terms should be reversed in the following description.

Inverse Tone Mapping in the Encoder

Figure 5:
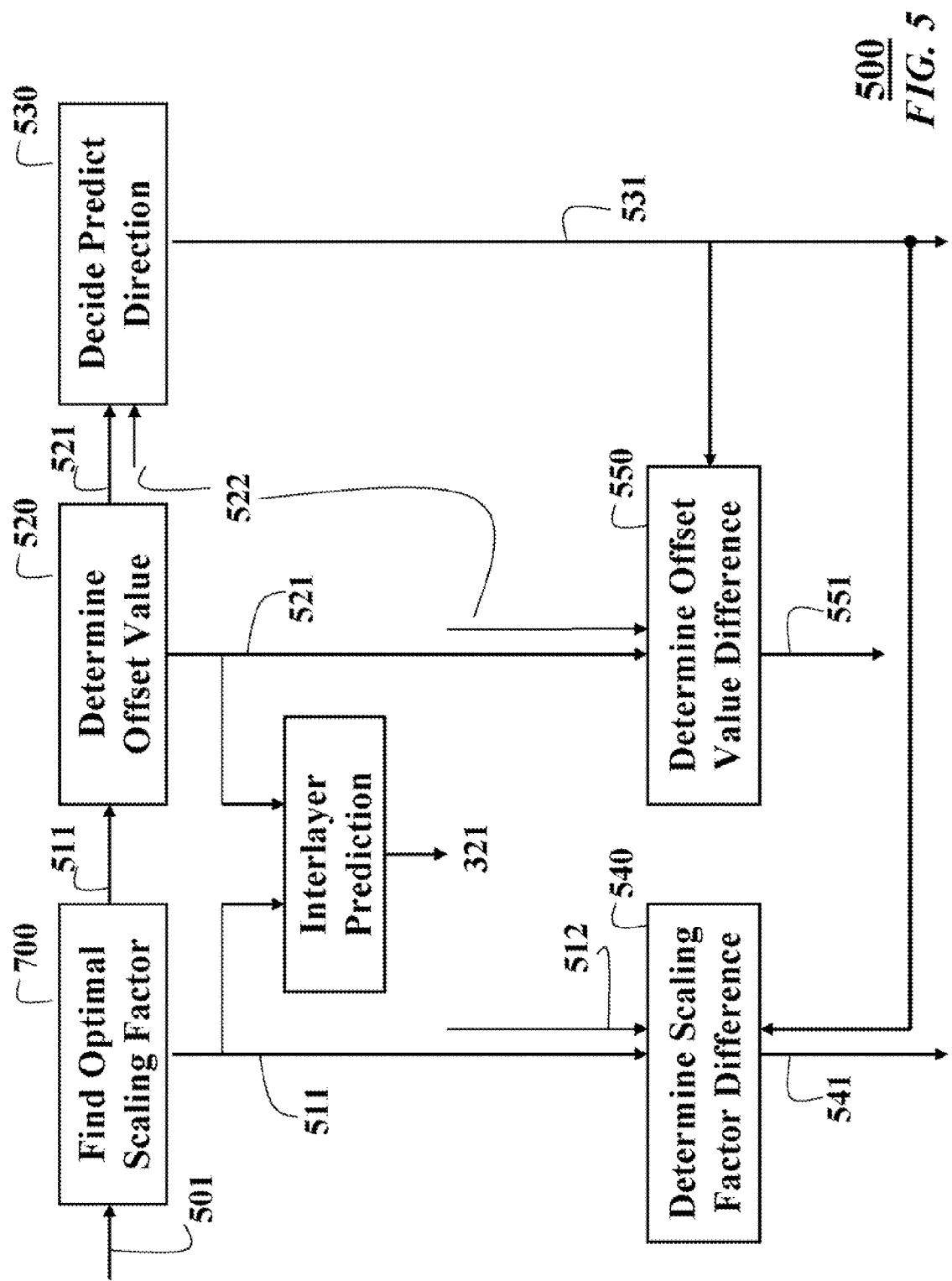
FIG. 5 is a block diagram of inverse tone mapping in an encoder according to an embodiment of the invention.

FIG. 5 shows an inverse tone mapping process according to an embodiment of the invention. The inverse tone mapping can be substituted for functional step 320 in FIG. 3. The tone mapping is applied to pixel intensity values 501 of each block and each color channel of each image to be converted.

Inputs to the method are the pixel intensity values 501 of a particular block. First, an optimal scaling factor 511 is determined 700 among a set of candidate scaling factors. For up-conversion the scaling factors are generally 1 or greater, and for down-conversion the factors are 1 or less. However, because the conversion also considers the factors, a strict adherence to the above scaling factor ranges is not required as long as the desired conversion is achievable.

The process 700 for determining the optimal scaling factor is described below. The offset value 521 is determined 520 as a mean of a difference between the up-scaled LDR pixel intensity values, using the optimal scaling factor 511, and the pixel intensity values in the current block 501.

In one embodiment of the invention, a prediction direction of the scaling factor follows a prediction direction of the offset value. The current offset value 521 is compared with reference (LEFT or ABOVE) offset values 522 of adjacent blocks. If the LEFT (block) offset value is closer to the current offset value 521, the prediction direction 531 is set as LEFT; otherwise, the prediction direction is set as ABOVE.

In another embodiment of the invention, the prediction direction of the offset value follows the prediction direction of the scaling factor. The current scaling factor is compared with the neighboring reference (LEFT or ABOVE) scaling factor. If the LEFT scaling factor is closer to the current scaling factor, the prediction direction 531 is set as LEFT; otherwise, the prediction, direction is set as ABOVE, The prediction direction can also be based on a function of differences of both the scaling factors and offset values between adjacent blocks. For instance, a weighted function of scaling and offset differences can be used.

Based on the prediction direction 531, the predicted scaling factor 512 is set as either the LEFT or ABOVE scaling factor and the predicted offset value 522 is set as either the LEFT or ABOVE offset value. A scaling factor difference 541 of the current scaling factor 511 and the predicted scaling factor 512 is determined 540. An offset value difference 551 of the current offset value 521 and the predicted offset value 522 is determined 550.

Figure 1:
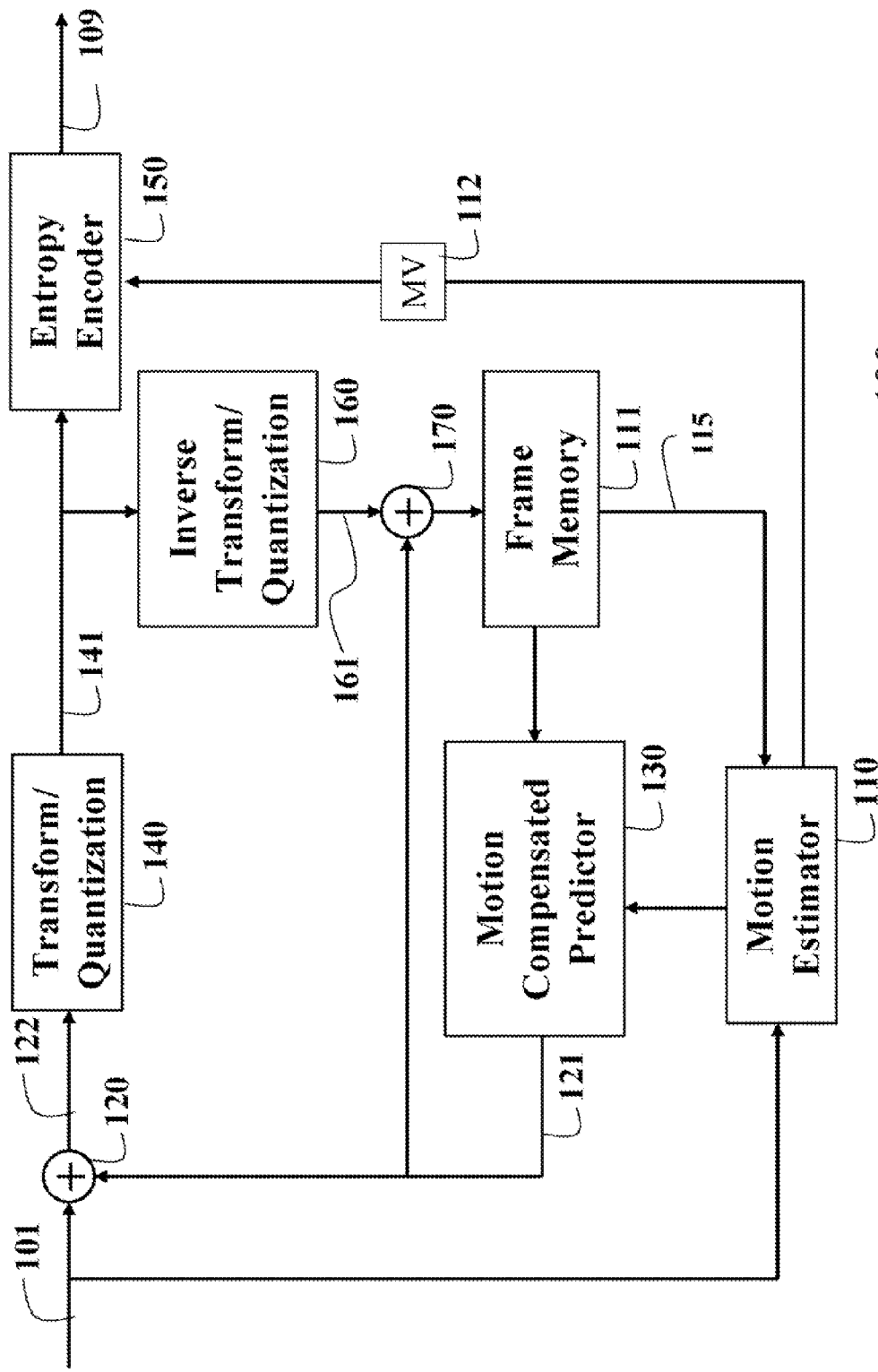
FIG. 1 is a block diagram of a prior art video encoder.
Figure 2:
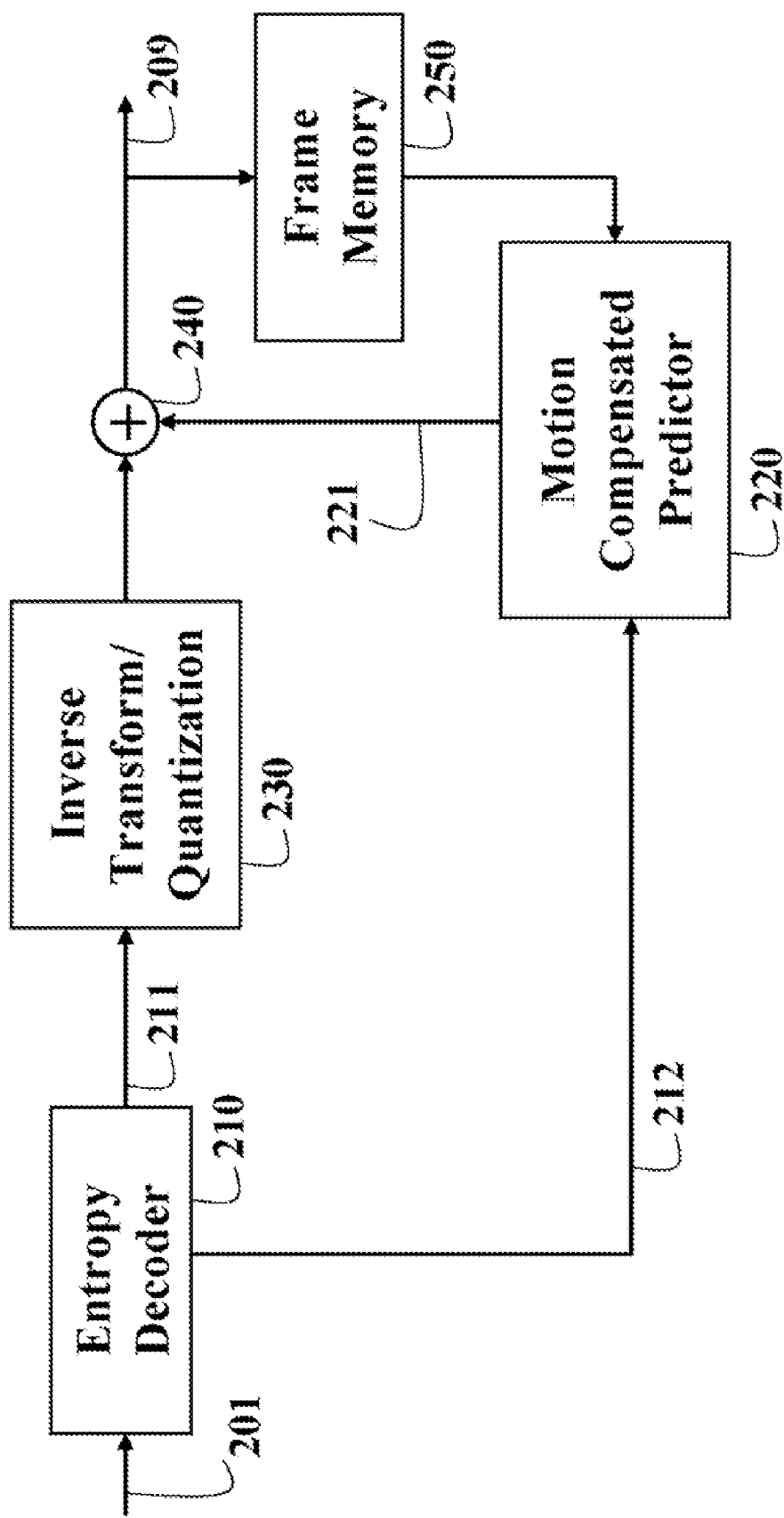
FIG. 2 is a block diagram of a prior art video decoder.
Figure 3:
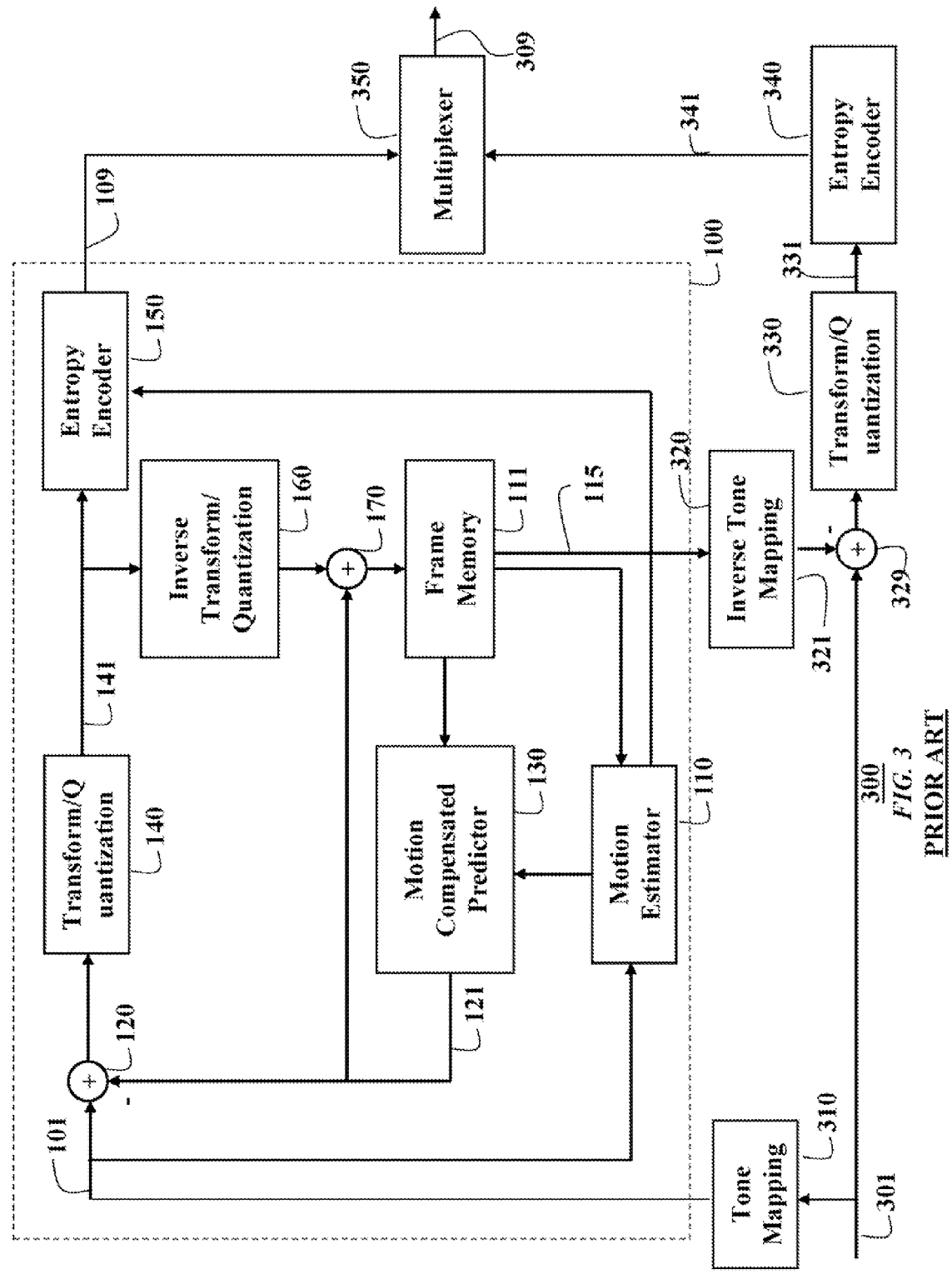
FIG. 3 is a block diagram of a prior art video encoder with bit-depth scalability.

The prediction direction 531, scaling factor difference 541, and the offset difference 551 are entropy encoded 340, see FIG. 3, and the resulting encoded bits are added 350 to the output bitstream 309.

For each pixel, an inter-layer predicted value 321 is determined by multiplying the scaling factor 511 with the LDR pixel intensity value and adding the offset value 521.

To reduce the overhead associated with each block, the prediction direction can also be derived from information present in the decoder. For example, the prediction direction can be determined according to the reconstructed DC coefficients of the current block and spatially neighboring blocks. The DC coefficient of the current block is compared with reference (LEFT or ABOVE) DC coefficients of adjacent blocks. If the LEFT DC coefficient is closer to the current DC coefficient, then the prediction direction 531 is set as LEFT; otherwise, the prediction direction 531 is set as ABOVE. When the prediction direction is determined in this implicit way, it does not need to be explicitly coded into the output bitstream.

Inverse Tone Mapping in the Decoder

Figure 4:
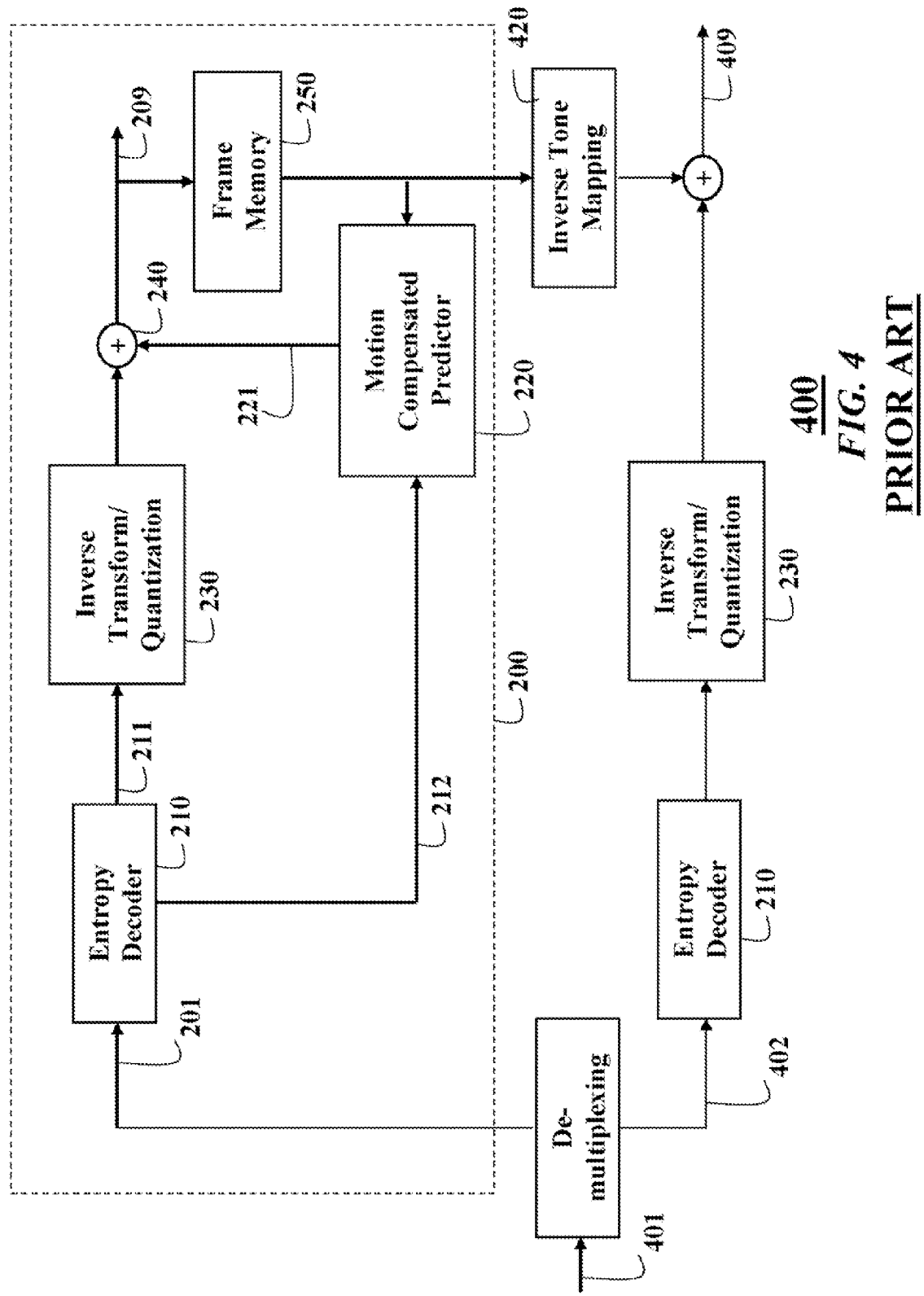
FIG. 4 is a block diagram of a prior art video decoder with bit-depth scalability.
Figure 6:
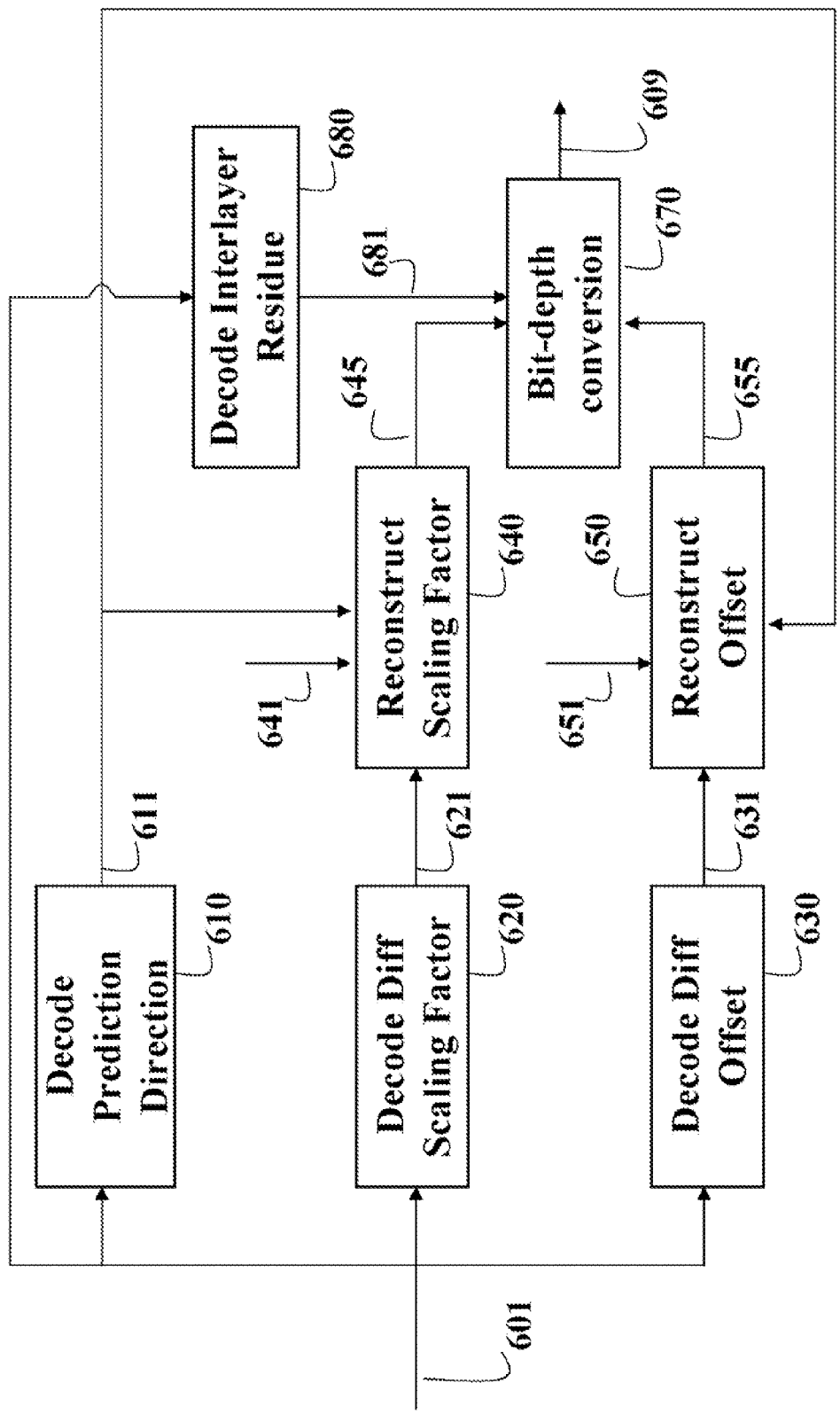
FIG. 6 is a block diagram of inverse tone mapping in a decoder according to an embodiment of the invention.

FIG. 6 illustrates the inverse tone mapping according to and embodiment of the invention the invention, which is applied for each block of each color channel and within the scope of the bit-depth scalable decoder 400. The tone mapping can be substituted for functional step 420 in FIG. 4. As stated above the mapping can be for up- or down-con version.

In one embodiment of the invention, the prediction direction 611, the scaling factor difference 621, and the offset value difference 631 for the current block for each color component are entropy decoded by steps 610, 620 and 630, respectively, from the input bit-depth scalable encoded bitstream 601.

In another embodiment of the invention, the prediction direction 611 is derived from the DC coefficients of spatially neighboring blocks. For instance, if the LEFT DC coefficient is closer to the current DC coefficient, then the prediction direction 611 is set as LEFT; otherwise, the prediction direction 611 is set as ABOVE.

According to the prediction direction 611, the predicted scaling factor 641 and the predicted offset value 651 are obtained from either the LEFT adjacent block, or the ABOVE. A scaling factor 645 of the current block is reconstructed 640 by adding the scaling factor difference 621 to the predicted scaling factor 641. The offset value 655 of current block 655 is reconstructed 650 by adding the offset value difference 631 to the predicted offset value 651.

The inter-layer residue 681 are entropy decoded 680.

The bit-depth conversion 670 multiplies each pixel intensity value by the scaling factor 645, and adds the offset value 655 and the inter-layer residue 681 to yield the tone mapped HDR block 609.

Determining Optimal Scaling Factor

Figure 7:
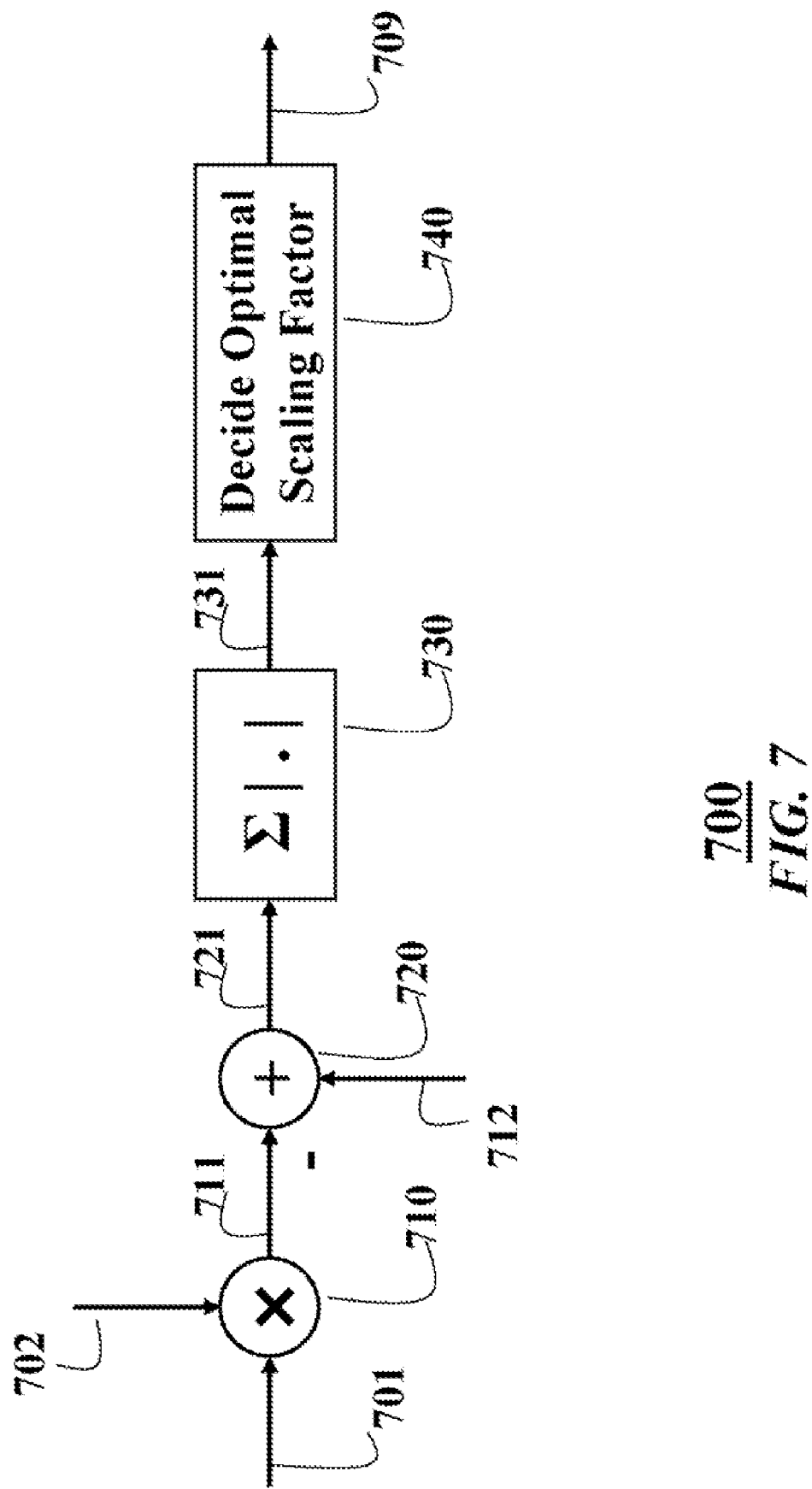
FIG. 7 is a block diagram of a process for determining an optimal block-based scaling factor for inverse tone mapping according to an embodiment of the invention.

FIG. 7 shows a process 700 for determining the optimal scaling factor for each block of each color channel according to an embodiment of the invention. The steps in the process are repeated for each candidate scaling factor in the set of candidate scaling factors. The pixel intensity values 501 are multiplied 710 by the candidate scaling factor 702 to yield scaled pixel intensity values 711. A difference 721 between the scaled pixel intensity values 711 and the input pixel intensity values 712 are determined 720 on a pixel-by-pixel basis. A sum of absolute difference (SAD) 731 of all pixel intensity values within the current block is determined 730. The SAD 731 generated by all scaling factor candidates are compared 740, and the scaling factor associated with the minimum SAD is selected as the optimal scaling factor for the block.

Instead of using the SAD criterion in the above process, alternative measurements, such as mean square error (MSE), or sum of absolute transformed difference (SATD) can also be used.

Another embodiment uses a least square (LS) fitting. In this way, the repetition for each scaling factor can be avoided to reduce the computational complexity when number of candidate scaling factors is large.

Comparison to Prior Art

In contrast to the prior art systems, the invention has significant differences and advantages. Our inverse tone mapping is block based, while the method described by Win ken et al, is global. Thus, the inverse tone mapping according to the invention is more suitable to ROI applications, while maintaining a high quality.

Also our inverse tone mapping technique does not require an initial delay before decoding and rendering. As a result, the coding scheme can be applied to real-time applications.

Our inverse tone mapping technique is also applied independent of the (forward) tone mapping technique that has been applied to determine the (LDR) pixel intensity values. This is important because, in practice, the decoder does not have knowledge of the tone mapping that was applied during the encoding.

Compared to the method described by Segall and Su, our inverse tone mapping parameters include a prediction direction, a scaling factor, and an offset value for each color channel of each block of each image. The prior art applies the same scaling factor and offset value to two chrominance components. Therefore, our inverse tone mapping method is more general to multi-color-channel applications, especially when different bit-depths are used for different color channels. It should be noted that out method can also be applied when more than three color channels are used.

Our inverse tone mapping predicts the block offset value, as well as the scaling factor, from adjacent blocks. The prior art does not predict an offset value. Instead, the offset value is coded as a DC coefficient in the frequency domain. By predicting offset values, our inverse tone mapping requires minimal overhead and leads to higher coding efficiency.

According to the invention, a range of the candidate scaling factors can dynamically be adapted according to the applications or the bit-depth of the input images. In the prior art, the scaling factor set is pre-defined. Therefore, the invention, applies more generally to applications and a wider range of image sources at different hit-depths.

It is to he understood that various other adaptations and modifications can be made within the spirit and scope of the invention. Therefore, it is the object of the appended claims to cover all such variations and modifications as come within the true spirit and scope of the invention.

We claim:

1. A method for inverse tone mapping of an image of a video, comprising for each block of each color channel of the image the steps of:

determining a scaling factor for a current block by adding a predicted scaling factor for the current block to a difference between the predicted scaling factor of the current block and the scaling factor of an adjacent block;

determining an offset value for the current block by adding a predicted offset for the current block to a difference between the predicted offset value of the current block and the offset value of the adjacent block; and applying the scaling factor and the offset value to pixel intensity values of the current block to produce a mapped block in which a bit-depth of the mapped block is greater than the bit-depth of the current block, wherein the steps are performed in a codec.

2. The method of claim 1, in which the determining and applying steps are performed for a sequence of images in a decoder of the codec.

3. The method of claim 1, in which the adjacent block is selected by a prediction direction.

4. The method of claim 3, in which the prediction direction, the difference between the predicted scaling factor of the current block and the scaling factor of the adjacent block, and the difference between the predicted offset value of the current block and the offset value of the adjacent block are obtained from a bitstream.

5. The method of claim 3, in which the prediction direction is determined from the scaling factor of the current block and the scaling factor of adjacent blocks.

6. The method of claim 3, in which the prediction direction is determined from the offset value of the current block and the offset value of adjacent blocks.

7. The method of claim 3, in which the prediction direction is determined from a DC coefficient of the current block and a DC coefficient of adjacent blocks.

8. The method of claim 1, in which the scaling factor of the current block and the offset value of the current block are determined in an encoder of the codec.

9. The method of claim 8, further comprising for each candidate scaling factor in a set of candidate scaling factors:
multiplying the pixel intensity values by the candidate scaling factor to yield scaled pixel intensity values;
determining a difference between the scaled pixel intensity values and the pixel intensity values; and
selecting the candidate scaling factor associated with a minimum difference as the scaling factor.

10. The method of claim 1, in which the determining and applying steps are performed in real-time.

11. The method of claim 1, in which the scaling factor of the current block is selected from a set of candidate scaling factors, and which a range of the scaling factors is adapted dynamically.

12. The method of claim 1, in which the adjacent block is selected from the block above the current block and the block to the left of the current block.

13. The method of claim 1, in which the difference between the predicted scaling factor and the scaling factor of the adjacent block, and the difference between the predicted offset value of the current block and the offset value of the adjacent block are obtained from an encoded bitstream.

14. The method of claim 1, in which the applying further comprises:
multiplying the pixel intensity values by the scaling factor and adding the offset value.

15. The method of claim 14, further comprising:
adding an inter-layer residue to the pixel intensity values.

* * * * *